United States Patent
Messel, Jr. et al.

(10) Patent No.: US 9,874,372 B2
(45) Date of Patent: Jan. 23, 2018

(54) REMOTELY ADJUSTABLE VENTILATION ORIFICE PLATE

(71) Applicant: Siemens Energy, Inc., Orlando, FL (US)

(72) Inventors: Robert R. Messel, Jr., Winter Spings, FL (US); Feng Fu, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 338 days.

(21) Appl. No.: 14/829,902

(22) Filed: Aug. 19, 2015

(65) Prior Publication Data
US 2017/0051944 A1  Feb. 23, 2017

(51) Int. Cl.
*F24F 13/12*  (2006.01)
*H02K 9/00*  (2006.01)
*H02K 3/24*  (2006.01)
*H02K 9/10*  (2006.01)
*H02K 15/00*  (2006.01)

(52) U.S. Cl.
CPC ............. *F24F 13/12* (2013.01); *H02K 3/24* (2013.01); *H02K 9/10* (2013.01); *H02K 15/00* (2013.01); *H02K 2205/09* (2013.01); *H02K 2209/00* (2013.01); *H02K 2213/09* (2013.01)

(58) Field of Classification Search
CPC .. H02K 9/00; H02K 9/08; H02K 9/10; H02K 9/12; H02K 9/16
USPC .......................... 310/52–52, 55–58; 251/212
See application file for complete search history.

(56) References Cited

U.S. PATENT DOCUMENTS

| | | | | |
|---|---|---|---|---|
| 1,453,333 A | * | 5/1923 | Baumann | H02K 9/12 310/58 |
| 4,018,420 A | * | 4/1977 | Muller | C21B 9/12 138/94.3 |
| 4,476,773 A | * | 10/1984 | Fehr | B60H 1/00471 137/625.47 |

(Continued)

FOREIGN PATENT DOCUMENTS

| | | | | |
|---|---|---|---|---|
| DE | 2854712 A1 | * | 7/1980 | H02K 9/18 |
| GB | 384611 A | * | 12/1932 | H02K 9/12 |
| JP | 59165940 A | * | 9/1984 | H02K 9/06 |

OTHER PUBLICATIONS

Gord Graff, Reviewed: The iVAC Pro Blast Gate 4 Starter Pack, The Woodworker's News & Reviews, Nov. 27, 2013, website: http://thewoodworkersnews.com/2013/11/reviewed-the-ivac-pro-blast-gate-4-starter-pack/.

*Primary Examiner* — Burton Mullins

(57) ABSTRACT

A remotely adjustable orifice plate arrangement for a generator is provided. The arrangement includes an enclosed generator with an interior wall including an orifice through which a fluid flows. The arrangement also includes a first plate including an orifice and a remotely controllable motor. The first plate is coupled to the interior wall within a flow area of the generator such that at least a portion of the orifice overlaps the orifice of the interior wall. The arrangement also includes an adjustable orifice plate including an orifice wherein the adjustable orifice plate slides relative to the first plate to determine the size of a resultant orifice of the interior wall. The motor selectively controls the slideable movement of the adjustable orifice plate relative to the first plate and is controlled remotely from outside the enclosed generator. A method to remotely adjust fluid flow within an enclosed generator is also provided.

14 Claims, 2 Drawing Sheets

(56) References Cited

U.S. PATENT DOCUMENTS

| | | | | |
|---|---|---|---|---|
| 4,760,773 | A * | 8/1988 | Pezzulli | F24F 7/02 |
| | | | | 454/348 |
| 6,170,521 | B1 * | 1/2001 | Rohr | F16L 55/10 |
| | | | | 137/613 |
| 7,431,638 | B2 * | 10/2008 | Natsume | B60H 1/00692 |
| | | | | 137/614.11 |
| 7,644,711 | B2 * | 1/2010 | Creel | F24B 1/192 |
| | | | | 126/21 R |
| 8,142,265 | B2 * | 3/2012 | Carter | F24F 13/12 |
| | | | | 454/289 |
| 2012/0129443 | A1 * | 5/2012 | Bastow | F24F 13/12 |
| | | | | 454/258 |

* cited by examiner

REMOTELY ADJUSTABLE VENTILATION ORIFICE PLATE

BACKGROUND

1. Field

The present application relates to generators, and more particularly to an arrangement and method to remotely adjust fluid flow within an enclosed generator.

2. Description of the Related Art

Ventilation testing is routinely done on a generator during major service and performed while the generator is in an outage condition. These ventilation tests are done by monitoring specific points near orifices in interior walls where fluid flows. The fluid flow is tested to determine whether aspects of the fluid flow meet certain requirements. For example, the blower orifice within the generator is routinely tested to determine if the pressure of the fluid flow lies within a certain required pressure range.

Currently, ventilation testing is performed by swapping out a set of standard orifice plates until a correctly sized orifice is determined. An example of a standard orifice plate is shown in FIG. 1. In the currently used testing procedure, the generator is shut down and opened up in order for testing personnel to enter inside the unit to install a standard orifice plate and then exit to perform the test. This may be a very time consuming trial and error process as multiple orifice plates with different orifice sizes may need to be installed inside the generator by testing personnel with the testing personnel going inside the generator to install the orifice plates and then going out of the generator to perform the testing. Testing is then done offline, with the generator rotating, in order to determine the correctly sized orifice needed to satisfy the required criteria. Consequently, the testing procedure may take up to 10 to 12 hours with the generator being offline and unable to supply electric power while the orifice testing and adjustments are completed and finalized.

SUMMARY

Briefly described, aspects of the present disclosure relates to a remotely adjustable orifice plate arrangement for a generator and a method to remotely adjust fluid flow within an enclosed generator.

A first aspect provides a remotely adjustable orifice plate arrangement for a generator. The remotely adjustable orifice plate arrangement includes an enclosed generator with an interior wall, the interior wall including an orifice through which a fluid flows. A first plate including a first orifice and a remotely controllable motor is coupled to the interior wall within a flow area of the generator such that at least a portion of the first orifice overlaps the orifice of the interior wall. The arrangement also includes an adjustable orifice plate including a second orifice wherein the adjustable orifice plate slides relative to the first plate to determine the size of a resultant orifice of the interior wall. The motor selectively controls the slideable movement of the adjustable orifice plate relative to the first plate and is controlled remotely from outside the enclosed generator.

A second aspect provides a method to remotely adjust fluid flow within an enclosed generator. The method includes providing an interior wall within the enclosed generator which includes an orifice through which a fluid flows, coupling a plate to the interior wall, the interior wall includes a remotely controllable motor and a first orifice within a flow area of the enclosed generator, disposing an adjustable plate with a second orifice such that the adjustable plate slides relative to the plate, and adjusting the size of the orifice of the interior wall by remotely controlling the motor to selectively control the slideable relative movement of the adjustable plate such that an overlap of the plate and the adjustable plate determines the resultant size of the orifice of the interior wall.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
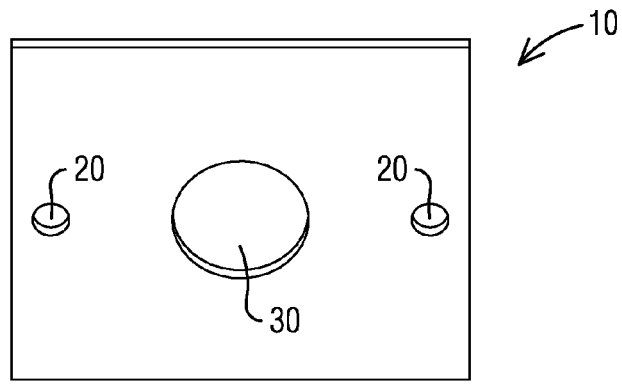
FIG. 1 illustrates a standard orifice plate.

Routinely, standard orifice plates, where each plate may include an orifice with a different sized diameter, have been used for ventilation testing across orifices within the generator. For example, standard orifice plates may be used for ventilation testing of the blower orifice. A standard orifice plate (10) is illustrated in FIG. 1. Two bolt holes (20) are shown on the lateral sides of the plate (10) in order to bolt the orifice plate (10) onto an interior wall within the flow area of the generator in front of an interior wall orifice. The orifice plate (10) in the shown embodiment includes a central orifice (30) with a specific diameter. The orifice plate (10) may be positioned such that the central orifice (30) is concentric with the orifice in the interior wall. Orifice plates with different sized diameters are swapped out by testing personnel until a correctly sized orifice diameter is found such that certain flow rate criteria are met. As mentioned previously, swapping out orifice plates by testing personnel has traditionally taken an indeterminate amount of time requiring the generator to be offline while the ventilation testing is carried out. Due to pressure from the customer to quickly perform the offline testing in order to return the generator to an online condition, occasionally, the correct orifice adjustments have not been made with the result that certain flow requirements are not met.

Figure 2:
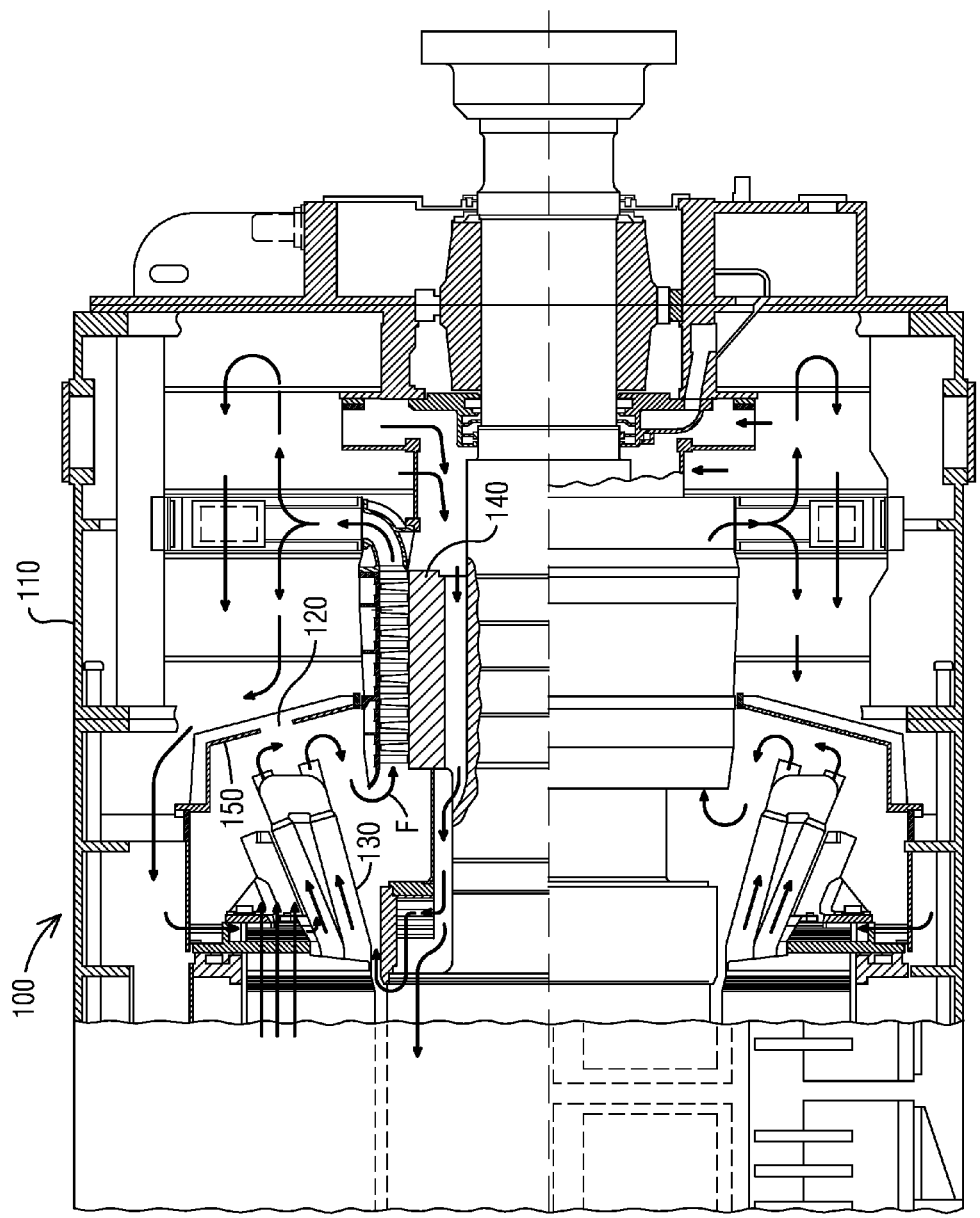
FIG. 2 illustrates a generator including a blower and a blower orifice.

FIG. 2 illustrates an enclosed generator (100). The generator is enclosed by an annular casing (110). Inside the generator (100), a fluid flow (F) is shown flowing from the stator winding (130) through the blower (140). The fluid flow (F), as shown using arrows, through the generator (100) is used for cooling. A blower orifice (120) is shown within an interior wall (150) of the illustrated generator (100). The blower orifice (120) provides an additional path, a bypass around the blower (140), for the fluid flow (F) within the generator (100). The fluid flow (F) through blower orifice (120) may decrease the pressure of the fluid flow (F) within the generator (100). A pressure within a certain range at the blower orifice (120) is desired to prevent the generator from experiencing an unstable fluid flow (F) creating a surge condition. While the blower orifice (120) is used for exemplary purposes, other orifices may exist within the generator (100) as well that may require ventilation testing.

FIG. 3 illustrates an embodiment of the remotely adjustable orifice plate arrangement (200). The remotely adjustable orifice plate arrangement (200) includes a first plate (230). The first plate (230) includes a first orifice (220). The first orifice (220) may be centrally disposed on the first plate (230) and/or may be concentric with the orifice of the interior wall (120). The first plate (230) may also include a remotely controlled motor (210). The remotely controlled motor (210) may be controllable from outside the enclosed generator (100) and may include position control. An adjustable orifice plate (240) including a second orifice (250) is also illustrated. The adjustable orifice plate (240) slides relative to the first plate (230). In order to enable the slideable movement (M), the adjustable orifice plate (240) may be coupled to the first plate (230).

The remotely controllable motor (210) may be controlled remotely from a location outside of the enclosed generator (100). The slideable movement (M) of the adjustable orifice plate (240) relative to the first plate (230) may be selectively controlled by the remotely controllable motor (210). Additionally, the remotely controllable motor (210) may include position control which provides more control over the positioning of the plates (230, 240).

Figure 3A:
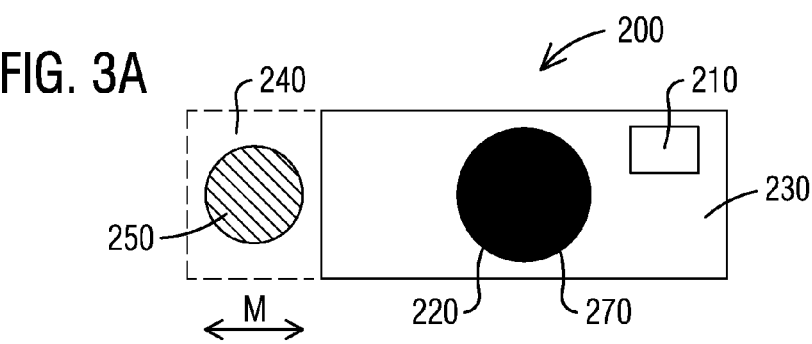
FIG. 3a illustrates the adjustable orifice plate in a position such that the first orifice and second orifice do not overlap.
Figure 3B:
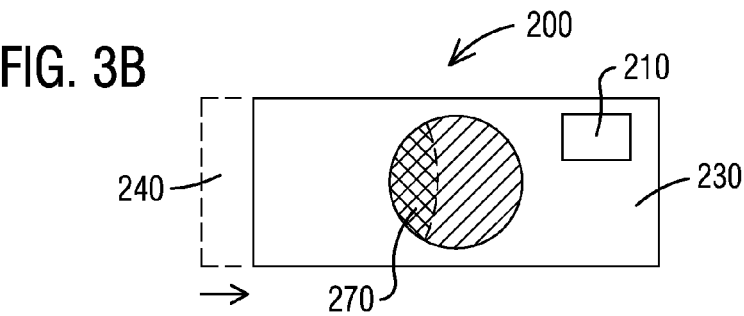
FIG. 3b illustrates a partial overlap of the second orifice with the first orifice.
Figure 3C:
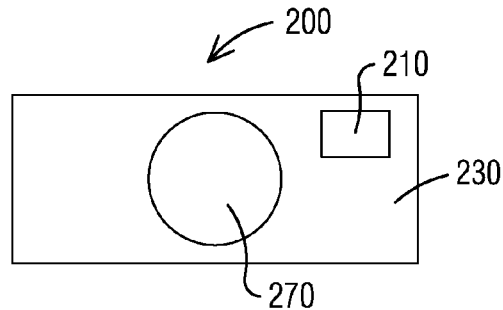
FIG. 3c illustrates the adjustable orifice plate in a position such that the first orifice and second orifice are concentric.

FIGS. 3a-3c illustrate different positions of the adjustable orifice plate (240) relative to the first plate (230). In the illustrated embodiment it will be assumed that the first orifice (220) and the orifice of the interior wall (120) are concentric. When the first plate (230) is coupled to the interior wall (150) such that the first orifice (220) and the orifice of the interior wall (120) are concentric, the relative position of the adjustable orifice plate (240) to the first plate (230) determines the size of the resultant orifice (270) of the interior wall (150). FIG. 3a illustrates the adjustable orifice plate (240) in a position such that the first orifice (220) and the second orifice (250) do not overlap. However, a solid portion of the adjustable orifice plate (240) overlaps with the first orifice (220). The result would be that the orifice of the interior wall (120) is blocked and no fluid flow would flow through the orifice of the interior wall (120). FIG. 3b illustrates a partial overlap of the second orifice (250) with the first orifice (220) resulting in a resultant orifice (270) as shown. FIG. 3c illustrates the adjustable orifice plate (240) in a position such that the first orifice (220) and second orifice (250) are concentric resulting in a resultant orifice (270) having the equivalent area as the first orifice (220) as shown.

Certain fluid flow requirements through the interior wall orifice are taken into consideration when determining the size of the resultant orifice (270). These fluid flow requirements may include a pressure requirement for the fluid flow through the orifice of the interior wall (120). The pressure requirement requires the pressure to lie within a specified range. A suitable pressure range for the fluid flow through the blower orifice may lie in a range of 0-95 psi. Additionally, the rate of the fluid flow may be taken into consideration when determining the size of the resultant orifice of the interior wall. A suitable fluid flow rate for the blower orifice may lie in the range 0-70 m$^3$/s.

The material of the first plate and/or the adjustable orifice plate may include carbon steel, aluminium, fiber glass or plastic. However, other materials may also be used.

Referring to FIGS. 1-3, a method to remotely adjust fluid flow within an enclosed generator (100) is also provided. In an embodiment, the enclosed generator (100) includes an interior wall (150) including an orifice (120) through which a fluid flows. A first plate (230) including a first orifice (220) may then be coupled to the interior wall (150). A remotely controllable motor (210) may also be disposed on the first plate (230). The coupling may include bolting the plate to the interior wall (150), however, other methods of coupling may also be used.

An adjustable plate (240) is disposed such that the adjustable plate (240) slides relative to the plate (230). The adjustable plate (240) also comprises an orifice, the second orifice (250). The relative slideable motion (M) of the adjustable plate (240) to the plate (230) may result in an overlap of the plate (230) to the adjustable plate (240) such that the resultant size of the orifice of the interior wall (120) is determined by the overlap of the two plates (230, 240). The slideable relative movement (M) of the adjustable plate (240) to the plate (230) may create an intersection of the first orifice (220) and the second orifice (250). In an embodiment, the two plates (230, 240) overlap such that the intersection of the first orifice (220) and the second orifice (250) determine the resultant size of the orifice of the interior wall (120).

In an embodiment, the first plate (230) and the adjustable plate (240) are removed and an orifice plate with a third orifice is installed within the flow area of the generator. The third orifice includes the resultant size of the orifice of the interior wall. The orifice plate may be installed such that it is attached to the interior wall (150). Additionally, the orifice plate may be positioned such that the third orifice is concentric with the orifice (120) of the interior wall (150).

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A remotely adjustable orifice plate arrangement for a generator, comprising:
   an enclosed generator including an interior wall, the interior wall comprising an orifice through which a fluid flows;
   a first plate including a first orifice and a remotely controllable motor, the first plate coupled to the interior wall within a flow area of the generator such that at least a portion of the first orifice overlaps the orifice of the interior wall; and
   an adjustable orifice plate including a second orifice,
   wherein the adjustable orifice plate slides relative to the first plate to determine the size of a resultant orifice of the interior wall,
   wherein the motor selectively controls the slideable movement of the adjustable orifice plate relative to the first plate, and
   wherein the motor is controlled remotely from outside the enclosed generator.

2. The arrangement as claimed in claim 1,
   wherein the size of the resultant orifice is determined based on specific fluid flow requirements.

3. The arrangement as claimed in claim 2,
wherein the fluid flow requirements include a pressure requirement for the fluid flow through the orifice of the interior wall, and
wherein the pressure requirement requires the pressure through the orifice of the interior wall to lie within a specified range.

4. The arrangement as claimed in claim 2,
wherein the fluid flow requirements include a flow rate requirement through the orifice of the interior wall, and
wherein the flow rate requirement requires the flow rate through the interior wall to lie within a specified range.

5. The arrangement as claimed in claim 1, wherein a material of the first plate and the adjustable orifice plate is selected from the group consisting of carbon steel, aluminum, fiber glass, and plastic.

6. The arrangement as claimed in claim 1, wherein the first orifice is concentric with the orifice of the interior wall.

7. The arrangement as claimed in claim 1, wherein the adjustable orifice plate is coupled to the first plate.

8. A method to remotely adjust fluid flow within an enclosed generator, the method comprising:
providing an interior wall within the enclosed generator which includes an orifice through which a fluid flows;
coupling a plate to the interior wall comprising a remotely controllable motor and a first orifice within a flow area of the enclosed generator;
disposing an adjustable plate with a second orifice such that the adjustable plate slides relative to the plate; and
adjusting the size of the orifice of the interior wall by remotely controlling the motor to selectively control the slideable relative movement of the adjustable plate such that an overlap of the plate and the adjustable plate determines the resultant size of the orifice of the interior wall.

9. The method as claimed in claim 8, wherein an intersection of the first orifice and the second orifice determines the resultant size of the orifice of the interior wall.

10. The method as claimed in claim 8, wherein the adjustable plate is coupled to the plate.

11. The method as claimed in claim 8, wherein the resultant size of the orifice of the interior wall is adjusted to meet specific fluid flow requirements.

12. The method as claimed in claim 8,
wherein the fluid flow requirements include a pressure requirement for the fluid flow through the orifice of the interior wall, and
wherein the pressure requirement requires the pressure through the orifice of the interior wall to lie within a specified range.

13. The method as claimed in claim 8,
wherein the fluid flow requirements include a flow rate requirement through the orifice of the interior wall, and
wherein the flow rate requirement requires the flow rate through the interior wall to lie within a specified range.

14. The method as claimed in claim 8, wherein the method includes removing the first plate and the adjustable plate and installing a third orifice plate with an orifice size such that the orifice of the interior wall meets the specific requirements.

* * * * *